United States Patent [19]

Uehara et al.

[11] Patent Number: 5,409,749
[45] Date of Patent: Apr. 25, 1995

[54] PREFORM WITH A HANGER HAVING A CONNECTING PORTION OF A SUBSTANTIALLY CIRCULAR CROSS-SECTION

[75] Inventors: Shinichi Uehara, Ueda; Tokuyoshi Nakajima, Nagano, both of Japan

[73] Assignee: Nissei ASB Machine Co., Ltd., Nagano, Japan

[21] Appl. No.: 147,439

[22] Filed: Nov. 5, 1993

Related U.S. Application Data

[63] Continuation of Ser. No. 780,106, Oct. 21, 1991, abandoned.

[30] Foreign Application Priority Data

Oct. 27, 1990 [JP] Japan .................................. 2-289085

[51] Int. Cl.[6] ............................................. B32B 1/00
[52] U.S. Cl. ................................ 428/35.7; 428/36.92; 428/99; 428/100; 428/192; 428/542.8; 215/1 C
[58] Field of Search .................. 428/34.1, 35.7, 36.9, 428/36.92, 99, 100, 192, 542.8; 215/1 C

[56] References Cited

U.S. PATENT DOCUMENTS

| | | | |
|---|---|---|---|
| 4,280,859 | 7/1981 | Thompson | 156/73.5 |
| 4,395,378 | 7/1983 | Alberghini et al. | 264/532 |
| 4,439,390 | 3/1984 | Abramov et al. | 264/297.2 |

FOREIGN PATENT DOCUMENTS

| | | |
|---|---|---|
| 55-103938 | 8/1980 | Japan . |
| 62-273823 | 5/1985 | Japan . |
| 62-146612 | 6/1987 | Japan . |
| 62-273822 | 11/1987 | Japan . |
| 63-11324 | 1/1988 | Japan . |

*Primary Examiner*—Charles R. Nold
*Attorney, Agent, or Firm*—Oliff & Berridge

[57] ABSTRACT

The present invention provides a preform used to mold a container with hanger. This preform has a cylindrical bottomed barrel portion, a flat plate-like hanger having a central opening formed therethrough and a connection formed on the bottom wall or the barrel portion substantially at the center thereof, the connection connecting between the hanger and the bottom of the barrel. When this preform is injection molded, a molten plastic material is charged into the mold cavity through a gate communicating with the end of the hanger. The molten plastic material is divided into two branch streams at the hanger molding cavity region. These two streams are re-combined at the connection. The connection is of substantially circular cross-section and functions as a gate For permitting the molten plastic material to flow into the barrel molding cavity region.

14 Claims, 4 Drawing Sheets

PREFORM WITH A HANGER HAVING A CONNECTING PORTION OF A SUBSTANTIALLY CIRCULAR CROSS-SECTION

This is a Continuation application Ser. No. 07/780,106 filed Oct. 21, 1991, now abandoned.

BACKGROUND OF THE INVENTION

1. Field of the Invention

The present invention relates to a preform usable in molding a container such as intravenous drip bottle, said container having a hanger which is used to hang the container upside down. The present invention also concerns a method of molding such a container.

2. Description of the Related Art

The molding of such a container requires an additional step of forming the hanger in addition to the conventional molding steps of injection molding a preform and stretch blow molding the preform into the final shape. On the other hand, it has been required to simplify the molding process for reducing the manufacturing cost. In addition, the hanger in such a container is required to have a high reliability since if the container is used as an intravenous drip bottle, any accidental separation of the hanger from the container body may affect the life of a patient.

Many proposals have been made to mold these containers having hangers. From the standpoint of the safety, it is desirable to injection mold a container body and a hanger as an integral unit. Some such proposals are disclosed in Japanese Patent Laid-Open Nos. Sho 62-273822, Sho 62-273823 and Sho 63-11324. These Laid-Open applications describe a process of injection molding a preform, the bottom of the preform being formed integrally with a perforated or non-perforated hanger. The hanger is formed into a flat plate having a given thickness. As seen from the figures in each Laid-Open application, the connection between the container bottom and the hanger is in the form of a flat connecting piece having a given thickness and a width which is substantially equal to the diameter of the preferred.

However, such a type of container having a hanger has not been put to practical use for the following possible reasons.

The injection molding is accomplished by injecting a molten plastic material into the mold cavity through a gate which is formed to connect with the central bottom end portion of the hanger. The molten plastic material will flow from the first cavity region in which the hanger is to be molded through the second cavity region in which said connecting piece of rectangular cross-section having a narrow width is to be molded into the third or final cavity region in which the cylindrical bottomed barrel of the container is to be molded.

With the conventional formation of a preform having no hanger, the plastic material flows into the final cavity region directly through the gate. This is very different from the formation of a preform having a hanger. In the latter case, the molten plastic material tends to flow into a particular circumferential position in the third cavity region (which is directly above the connecting piece) more easily since the material flows into the final cavity region through the second cavity region which is used to mold the connecting piece of rectangular cross-section having the reduced width. Thus, the flow velocity of the molten plastic material becomes irregular through the circumferential positions of the preform barrel. This results in unevenness or deviation in temperature at the circumferential positions of the preform barrel. If a preform having such a deviation in temperature is biaxially stretched and blow molded, the wall-thickness of the circumferential side wall of the molded container will be uneven throughout.

It is further desirable that a hinge member permitting the hanger to be folded or bent is formed between the hanger and the bottom wall of the container. In such a case, the prior art injection molds a hinge member having a reduced wall-thickness at the proximal end of the connecting piece adjacent to the bottom wall of the preferred, as shown in Japanese Patent Laid-Open No. Sho 62-273822. However, this results in reduction of the size of the entrance for moving the molten plastic material into the barrel of the preform. Thus, the material will be cooled at the thinner hinge portion. As a result, the molten plastic material is prevented from flowing into the final or container barrel molding cavity region. This leads to failure molding and greatly decreases the number of suitable container.

SUMMARY OF THE INVENTION

It is therefore an object of the present invention to provide a new and improved preform which can be injection molded with a hanger as a unit and which can be easily molded into a container with a hanger by preventing any unevenness in temperature from being generated through the circumferential side wall of the preform to provide a substantially uniform wall-thickness of the side wall.

Another object of the present invention is to provide a method of molding a preform with hanger without disturbing the flow of the molten plastic material and also a container with hanger having a uniform wall-thickness.

Still another object of the present invention is to provide a molding method which will not disturb the flow of the molten plastic material on injection molding a preform and which can mold a container with hanger including a hinge formed between the bottom of the container and the hanger.

To this end, the present invention provides a preform used to mold a container with hanger, the preform being injection molded as a unit to comprise:

a cylindrical bottomed barrel portion;

a flat plate-like hanger including a central opening formed therein; and a connecting portion of substantially circular cross-section for connecting the hanger to the bottom wall of the barrel portion substantially at its center.

When the preform of the present invention is to be injection molded, a molten plastic material is charged into the mold cavity through a gate connecting the end of the hanger. The flow of the molten plastic material is directed into two directions at a hanger molding region and recombined at a connection of substantially circular cross-section which serves as a gate for permitting the molten plastic material to flow into a barrel molding cavity portion. More particularly, such a connection functions to cause the molten plastic material to flow along the circumferential wall of the barrel at a uniform velocity without any specified directional property. In such a manner, the preform with hanger can be injection molded without any unevenness in temperature through the circumferential wall of the barrel.

The external diameter of the connection is preferably ranged between 2 mm and 6 mm. If the external diameter of the connection is smaller than the lower limit, that is, 2 mm, the molten plastic material becomes difficult to flow therethrough. If the external diameter is larger than the upper limit, that is, 6 mm. the connection becomes difficult to function as a gate. From the standpoint of that any weld is prevented from being formed at the perforated hanger, it is desirable that the external diameter of the connection is as small as possible. From this fact, it is more preferable that the external diameter of the connection ranges between 3 mm and 4 mm.

The length of the connection preferably ranges between 4 mm and 10 min. If the length of the connection is smaller than the lower limit, it is difficult to assure that the connection functions as a gate for controlling the flow of the molten plastic material along the longitudinal axis of the preform. In order to assure the desired gate function, the length of the connection must not be longer than necessary. If the length of the connection is longer than the upper limit, it raises a problem in its mechanical strength. If the connection is to be formed with a hinge by locally reducing the connection in thickness, the length of the connection should not be longer than necessary from the standpoint of the fact that when the hanger is to be folded at the hinge parallel to the bottom wall of the preform, the hanger must be received within the dimension of the bottom wall. In consideration of such a fact, it is further preferable that the length ranges between 4 mm and 6 mm.

It is preferable that the configurations of the hanger and its opening formed therein are in line symmetrical to the axis of the connection. This provides for the molten plastic material to flow substantially at the equivalent velocity along the molding regions opposite to each other about the opening of the hanger.

If the connection includes a foldable hinge portion which is compressively formed to have its wall-thickness, reduced after the preform has been injection molded, a container with a hanger molded from such a preform can be self-supported by its bottom wall on any flat surface when it is not used.

The present invention also provides a method of molding a container with a hanger, said method comprising the steps of:

Injection molding a preform by at least using an injection cavity mold which includes a barrel molding cavity for molding a cylindrical bottomed barrel, a hanger molding cavity for molding a flat plate-like hanger having a central opening formed therein, a connection molding cavity for molding a connection of substantially circular cross-section connecting the hanger-to the bottom wall or the barrel substantially at its center and a gate connecting the hanger molding cavity, and an injection core mold arranged within the barrel molding cavity and by charging a molten plastic material into the respective cavities through said gate such that the molten plastic material will be re-combined at the connection molding cavity after it has passed through the hanger molding cavity and using the connection molding cavity as a gate for charging the molten plastic material into the barrel molding cavity; and biaxially stretching and blow molding the preform into a container with a hanger.

In accordance with the method of the present invention, the connection functions as a gate for the flow of the molten plastic material when the molten plastic material is conducted into the barrel molding region through the hanger molding region. Thus, the molten plastic material can flow substantially at the equivalent velocity along the circumferential side wall or the barrel molding region. This results in uniform distribution of temperature to the entire circumference of the barrel of the injection molded preform. This preform can be biaxially stretched and blow molded into a container having a substantially uniform wall-thickness through its circumferential length.

It is preferred that the method of the present invention includes a step of compressing the peripheral face of the connection of substantially circular cross-section to form a recess therein. Such a compressing step may be performed at a step of adjusting the temperature of the preform, a step of biaxially stretching and blow molding the preform into the container or any subsequent step. As a result, it is assured that the external diameter of the connection has a sufficient size to permit the connection to function as a gate. This results in a uniform and smooth flow of the molten plastic material. At the subsequent step, the connection can be compressed and deformed to form a flexible hinge for permitting the hanger to be folded.

BRIEF DESCRIPTION OF THE DRAWINGS

Pig. 1 is a schematically front view of one embodiment of a preform designed in accordance to the present invention.

DETAILED DESCRIPTION OF THE PREFERRED EMBODIMENTS

One embodiment of the present invention which is applied to produce an intravenous drip bottle with hanger will now be described with reference to the accompanying drawings.

Figure 2:
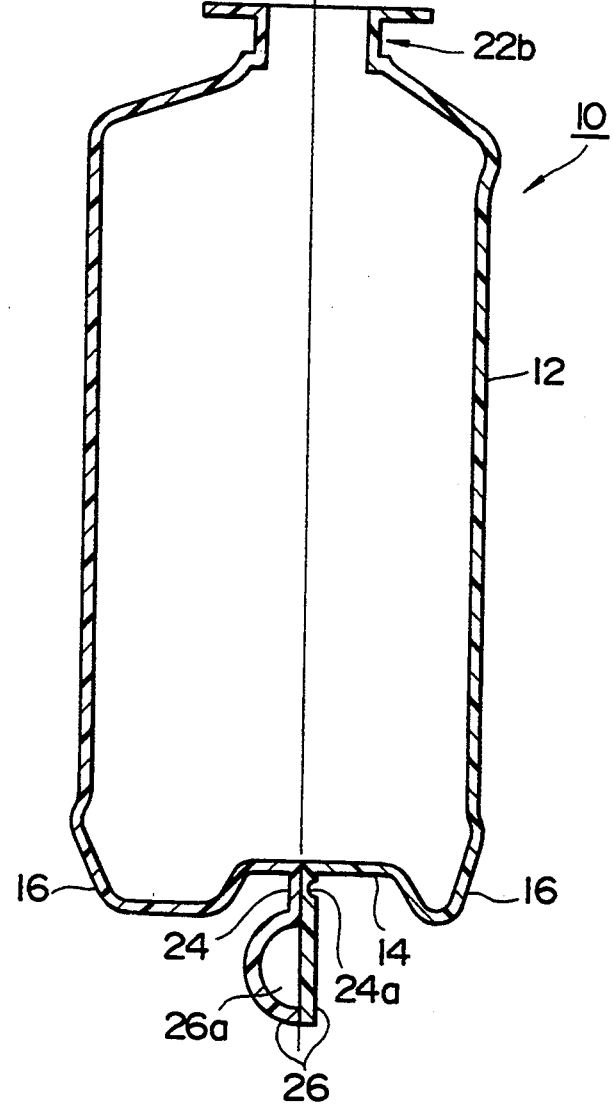
FIG. 2 is a longitudinal cross-section of an intravenous drip bottle molded from the preform shown in FIG. 1, the left-hand part of this figure about the central line being a front cross-sectional view and the right-hand part thereof being a side cross-sectional view.

Referring first to FIG. 2, there is shown an intravenous drip bottle 10 which comprises a ring-shaped side wall 12 of substantially rectangular cross-section and a bottom wall 14 formed therein at the bottom end of the side wall 12. The bottom wall 14 includes a loot portion 16 formed therein which serves as a base when the intravenous drip bottle 10 is erected on any flat surface. The opened end of the intravenous drip bottle 10 is formed with a neck portion 22b having a desired configuration. The bottom wall 14 includes a connection 24 of circular cross-section formed therein at the center, the lower end of the connection 24 being formed, at its lower end, with a flat and circular ring-like hanger 26. The hanger 26 includes a central opening 26a formed therein coaxially with the external profile of the circular hanger 26. The proximal end of the connection 24 includes a recessed hinge portion 24a which permits the hanger 26 to be folded when the intravenous drip bottle 10 is erected on the flat surface.

Figure 1:
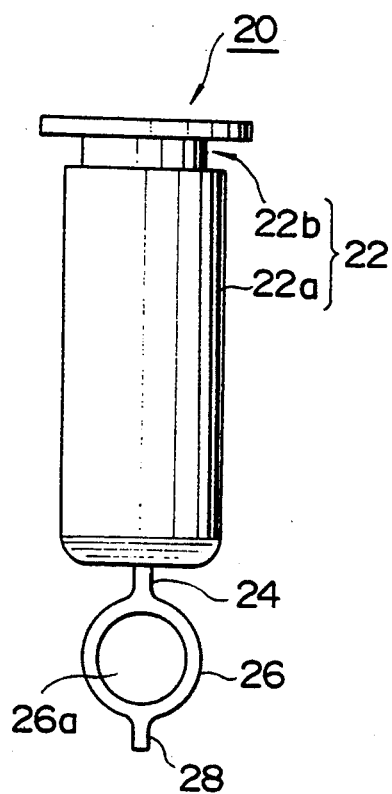

FIG. 1 shows a preform 20 used to mold such an intravenous drip bottle 10. The preform 20 comprises a cylindrical bottomed barrel portion 22a, a neck portion 22b formed therein at the opened end, said connection 24 connected with the bottom end of the barrel 22a and said hanger 26 connected with the connection 24. Namely, the neck portion 22b, connection 24 and hanger 26 have been formed at the same time when the preform 20 has been injection molded. On injection molding, the connection 24 of the preform 20 is still not formed with the hinge portion 24a.

The process of molding the intravenous drip bottle 10 will be described with reference to FIGS. 3 to 5.

Figure 3A:
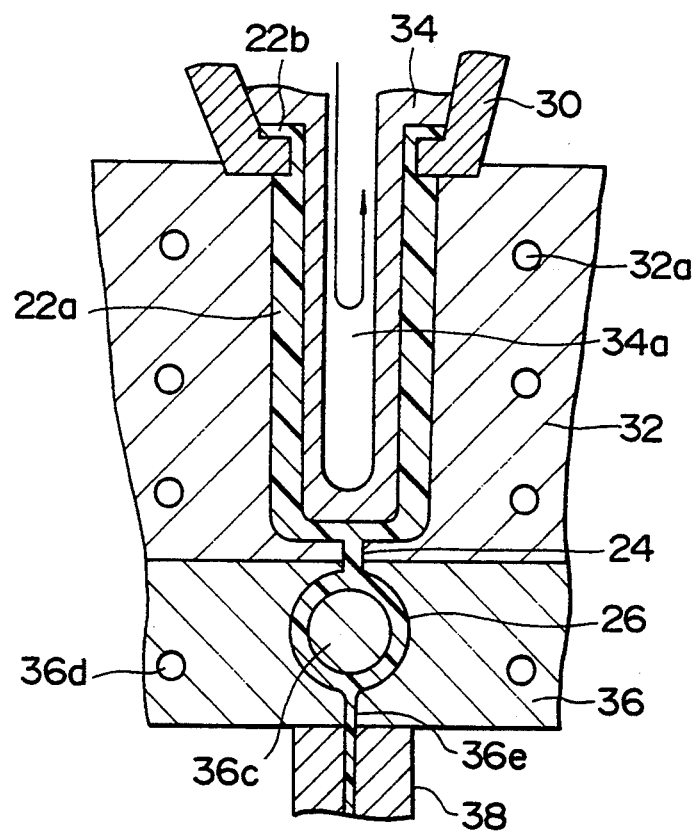
FIG. 3A is a front cross-sectional view of the primary part of an injection molding machine used to injection mold a preform in accordance with the present invention.
Figure 3B:
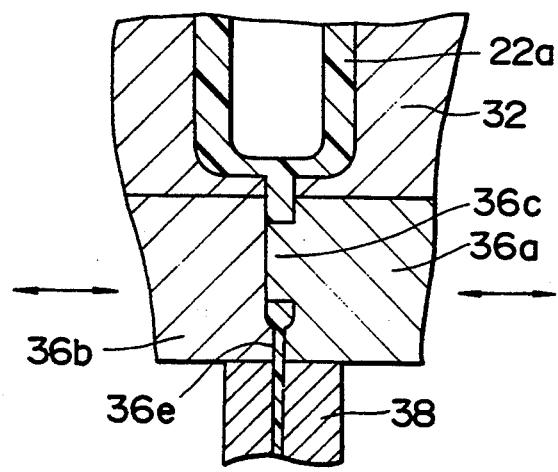
FIG. 3B is a fragmentary and enlarged side cross-sectional view showing a part of the machine shown in FIG. 3A.

FIGS. 3A and 3B illustrate a step of injection molding the preform 20. This injection molding step is accomplished by utilizing a neck mold 30 for defining the outer wall of the neck portion 22b in the preform 20, a barrel molding cavity mold 32 for defining the outer wall of the barrel portion 22a, a core mold 34 for defining the inner wall of the preform 20, a hanger molding cavity mold 36 and a hot runner 38. A cavity for defining the outer wall of the connection 24 is formed by the barrel molding cavity mold 32 and the hanger molding cavity mold 36. File core mold 34 includes an axially extending cooling medium jacket 34a through which a cooling medium such as water will be circulated. The injection cavity mold 32 includes cooling water jackets 32a formed therethrough. The hanger molding cavity mold 36 is a split mold consisting of two mold halves 36a and 36b which are joined together to form a cavity for defining the outer wall of the hanger 26 and a gate 36e communicating with this cavity. One of the mold halves 36a includes a stub 36c extending toward the other mold half 36b, the stub 36c being used to form an opening 26a in the hanger 26 when molded. The hanger molding cavity mold 36 also includes cooling water jackets 36d formed therethrough. Alternatively, the barrel and hanger molding cavity molds 32 and 36 may be integrally formed as a unit which provides a single injection cavity mold. The hanger molding cavity mold 36 may not be necessarily of a split mold type. In the latter case, the hanger molding cavity mold 36 may include a slidable pin corresponding to the stud 36c. It is to be understood that the present invention may be applied to any other suitable type of injection cavity mold.

The preform 20 is injection molded from a molten plastic material which is charged into the cavities through the hot runner 38. The molten plastic material is conducted into the hanger mold cavity through the gate 36e and then divided into two streams which flow along the opposite semi-circular passages for the ring-shaped hanger 26. These streams are re-combined at the connection 24 of semi-circular cross-section. From the connection 24, the molten plastic material flows upwardly into the cavity region used to mold the barrel portion 22a and further along the circumferential extent of the barrel 22a. The molten plastic material further flows upwardly and finally into the cavity region for molding the neck portion 22b.

It is to be noted herein that the molten plastic material flowing into the region of the barrel 22a is one that is once branches into two streams and re-combines the connection 24. The molten plastic material moves upwardly through the vertically extending passage for molding the connection 24 into the region for the barrel 22a. Therefore, the flowing plastic material does not have any directional property by which the material may move through a particular circumferential position at a speed higher than that in another circumferential position. As a result, the molten plastic material can flow upwardly at a uniform speed through the barrel mold cavity 22a while maintaining substantially the same level at the same time. In other words, the connection mold cavity 24 of semi-circular cross-section functions as a gate for causing the molten plastic material to flow into the region for the barrel 22a.

In order to assure such a gate function, the diameter D of the connection 24 preferably ranges between 2.0 mm and 6.0 mm and more preferably between 3.0 mm and 4.0 min. The length L thereof ranges between 4 mm and 10 mm and more preferably between 4 mm and 6 mm. At this time, the connection 24 may have such a taper angle $\Theta$ that the top end thereof has its external diameter larger than that of the bottom end. Furthermore, a radius R may be provided at a joint between the connection 24 and the bottom wall 14.

In such a manner, the preform 20 can be injection molded from the molten plastic material supplied to the region for the barrel 22a while being substantially flowing at a uniform speed in that cavity mold, so that the molded preform 20 will not have any unevenness in the circumferential direction. In the step of injection molding the preform 20, it is not required that the hinge portion 24a is formed at the connection 24. Consequently, the diameter or the connection 24 serving as a gate can be maintained constant. As a result, the flow of molten plastic material will not be disturbed. The rate or failure on molding can be greatly reduced.

After separation, the molded preform 20 will be carried to any subsequent step while being held by the neck mold 30.

If the preform 20 is to be formed into an intravenous drip bottle, the material of the preform 20 is preferably polypropylene, but may be any other suitable plastic material, for example, one selected from a group consisting of thermoplastic polyester resins such as polyethylene terephthalate (PET), polybutylene terephthalate and polyarylate, polyamide (nylon) resins and polyvinyl chloride.

Figure 4:
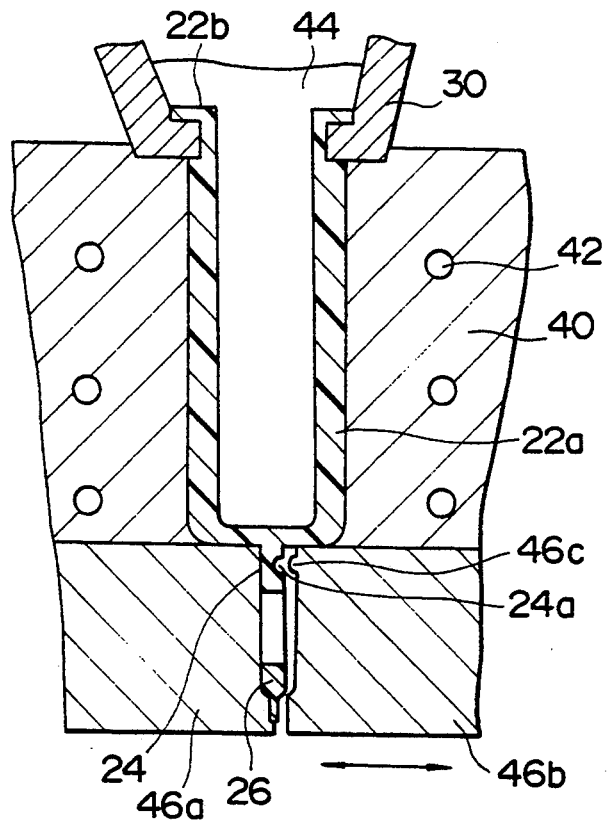
FIG. 4 is a view similar to FIG. 8B, illustrating a step of regulating the temperature in the preform, the step including a step of forming a hinge portion.
Figure 6:
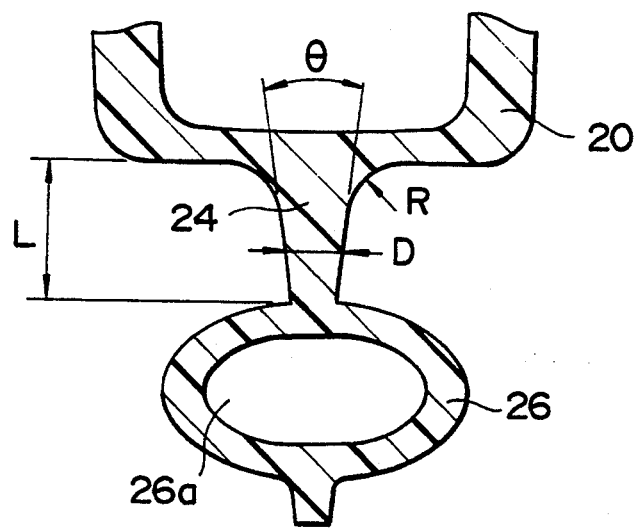
FIG. 6 is a schematically cross-sectional view illustrating the configuration of a connection.

FIG. 4 shows a step of regulating the temperature in the preform 20, In this step, the preform 20 being held by the neck mold 30 is placed in a temperature regulating pot 40 which includes a temperature regulating member 42 such as a heater wire. A temperature regulating core 44 is inserted into the neck portion 22b. Thus, the preform 20 can be set at an optimum temperature at which the stretch blow molding step is carried out. In this embodiment, the temperature regulating step includes an additional step of pressing the connection 24 to form a hinge portion 24a. For such a purpose, split mold halves 46a and 46b may be separated from each other are arranged below the temperature regulating pot 40. In this embodiment, one of the mold halves 46a is stationary while the other mold half 46b is movable. The mold half 46b includes a projection 46c formed therein for forming the hinge portion in the connection 24. When the movable mold half 46b is pressed against the stationary mold half 46a, a recess is formed in the connection 24 adjacent the distal end thereof to form the hinge portion 24a. This time, the temperature in the preform 20 is relatively high since it is just now injection molded. In addition to this fact, the preform 20 is being regulated in temperature. Thus, the hinge portion 24a can be easily formed in the compressing step. The temperature regulating means may be included in one or both of the split mold halves 46a and 46b.

Figure 5:
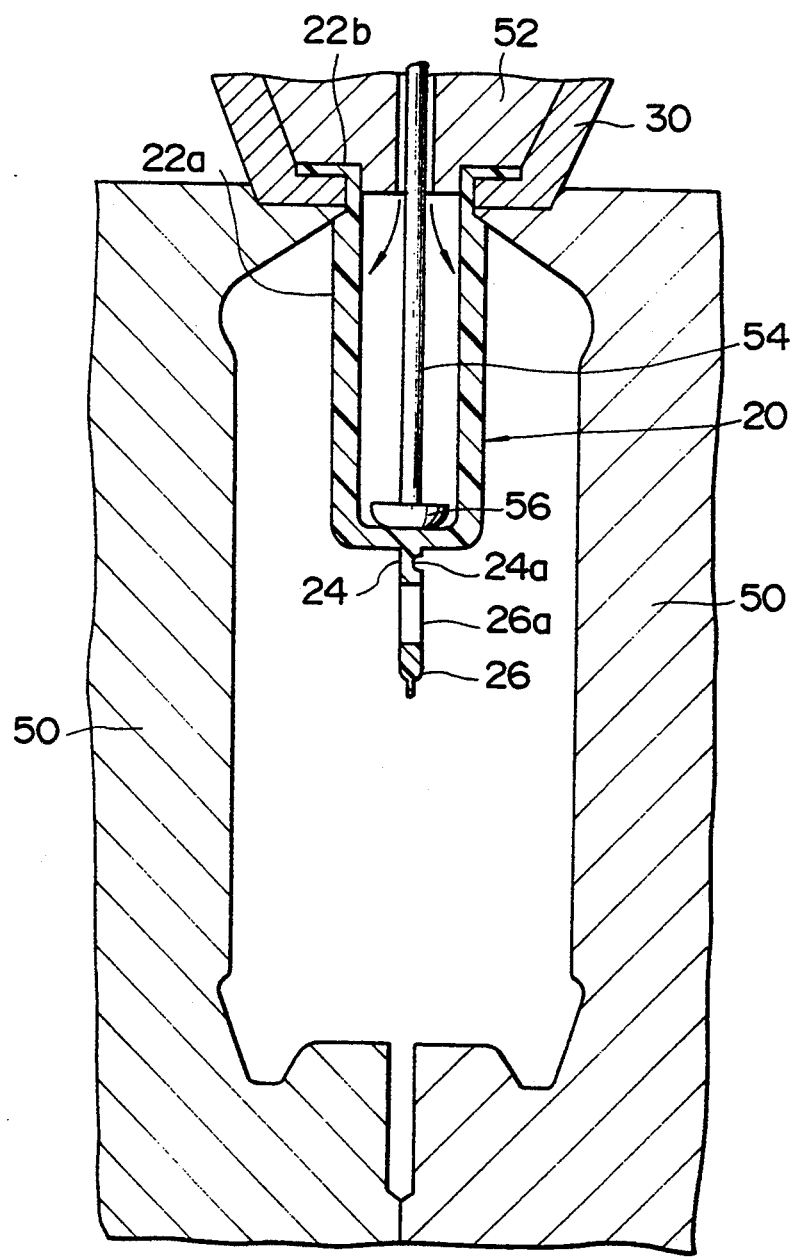
FIG. 5 is a cross-sectional view illustrating the biaxial stretching and blow molding step.

FIG. 5 shows a step of stretch blow molding the preform 20 into a final product. For such a purpose, there are provided a pair of blow cavity molds 50 which can be opened or closed in a horizontal direction as viewed in FIG. 5. Above these blow cavity molds 50 is carried the preform 20 while being held, at the neck portion 22b thereof, by the neck mold 30. Subsequently, the preform 20 will be set in between the blow cavity molds 50. A core mold 52 and a stretch rod 54 are moved downwardly from above the preform 20 into-the neck portion 22b of the preform 20 until a stretch member 56 on the lower end of the stretch rod 54 is brought into engagement with the inner bottom wall of the preform 20. As the stretch rod 54 is further moved downwardly, the preform 20 is axially stretched. At the same time, a pressurized fluid such as air is blown into the interior of the preform 20 to stretch it biaxially or in the axial and radial directions. In such a manner, the intravenous drip bottle 10 shown in FIG. 2 will be blow molded.

The preform 20 can be biaxially stretched and blow molded into the intravenous drip bottle 10 which has a uniform thickness throughout the barrel thereof since the barrel 22a of the preform 20 has a uniform temperature throughout the circumferential wall thereof. Since in this embodiment, the hanger 26 is injection molded with the connection 24 and barrel 22a of the preform 20, the hanger 26 can have a sufficient strength to support the intravenous drip bottle 10 with an increased reliability even if the bottle 10 containing its contents is hanged upside down by the hanger 26. This is very suitable when the container molded according to the method of the present invention is used in medical applications such as the intravenous drip bottle 10.

It is to be understood that the present invention is not limited to the aforementioned embodiment and-that many modifications and changes may be made by a person skilled in the art within the scope of the invention.

While the cross-section of the connection 24 is desirably circular from the standpoint of the reliable gate function and the mold workability, it may be formed to have a substantially circular cross-section within a range in which the gate function will not be disturbed. While the above embodiment has been described as to the compressive formation of the hinge portion 24a in the stop of regulating the temperature in the preform 20, the present invention is not limited to such a stop. For example, the compressive formation of the hinge portion 24a may be carried out after the stop of injection molding the preform 20 or at or after the axially stretching and blow molding stop.

From the standpoint of the realization of the hinge molding step while maintaining the preform hot as in the injection molding stop, it is preferred that the present invention is applied to a so-called one-stage molding system wherein the preform 20 is carried by the neck mold 30 from the injection molding station to the stretch blow molding station. However, the present invention may be applied to a two-stage molding system wherein the step of injection molding the preform 20 is made separately and independently from the step of molding the final container.

As will be apparent from the foregoing, the preform injection molded according to the present invention can have a substantially circular cross-section connection between the hanger and the barrel. This connection can function as a gate which permits the molten plastic material to flow toward the neck portion of the preform while the molten plastic material is maintained substantially at the same level along the inner peripheral wall of the preform. As a result, the preform can have a uniform temperature in the circumferential direction. If such a preform is used to form a final product, the final container will not have any irregularity in thickness due to the irregular distribution of temperature in the preform.

Since the method of the present invention uses such a preform to mold a final product, it can mold a container with hanger having no irregularity in wall-thickness. In addition, the connection can be formed to have a sufficient diameter to permit the flow of molten plastic material when the preform is injection molded, since-the flexible hinge portion permitting the hanger to be folded is formed after the injection molding step. This decreases the rate of failure on molding and improves the yield. Since the hanger can be molded with the preform as a unit, the separation of the hanger from the container body can be reliably prevented. This fact is particularly important in medical applications. Since the hanger is formed in the injection molding step, the configuration of the hanger can be freely designed such that it can be more easily hooked on any suitable hook means. This will not adversely affect to the injection molding step or stretch blow molding step at all.

We claim:

1. A preform used to mold a container with hanger, the preform being injection molded as a unit to comprise:
   a cylindrical bottomed barrel portion having a circumferential wall and an annular bottom wall radially extending from a center point of said bottom wall;
   a flat hanger including a central opening formed therein; and
   a connecting portion of substantially circular cross-section for connecting the hanger to the center point of said bottom wall of the barrel portion such that a portion of said annular bottom wall is separate from said flat hanger in a longitudinal direction.

2. A preform as defined in claim 1 wherein an external diameter of said connection ranges ranged between 2 mm and 6 mm.

3. A preform as defined in claim 2 wherein a length sad connection ranges between 4 mm and 10 mm.

4. A preform as defined in claim 1 wherein the configuration of the opening .formed in said hanger and the profile of the hanger itself are in line symmetry to the axis of said connection.

5. A preform as defined in claim 1 wherein said connection has a hinge portion formed therein by compressing said connection to form a thin-walled portion alter an injection molding step, said binge portion being flexible to permit said hanger to be folded.

6. A container with hanger made according to the method comprising the steps of:
   injection molding a preform by
   at least using an injection cavity mold which includes: a barrel molding cavity for molding a cylindrical bottomed barrel having an annular bottom wall radially extending from a center point of said bottom wall; a hanger molding cavity for molding a flat hanger having a central opening formed therein; a connection molding cavity having a substantially circular cross-section and extending between the barrel molding cavity and the hanger molding cavity, the connection molding cavity for molding a connection of substantially circular cross-section connecting the hanger to the center point of said bottom wall of the barrel such that a portion of said annular bottom wall is separate from said flat hanger in a longitudinal direction; a gate connecting to the hanger molding cavity; and an injection core mold arranged within the barrel molding cavity; and by charging a molten plastic material in the respective cavities through said gate such that the molten plastic material will be re-combined at the connection molding cavity after it has passed through said hanger molding cavity; and using said connection molding cavity as a gate for charging the molten plastic material into the barrel molding cavity at a uniform velocity and temperature to form said barrel of the preform; and biaxially stretching and blow molding said preform into a container with hanger.

7. A container with hanger made according to the method defined in claim 6, wherein said method further comprises a step of locally compressing said connection to form a thin-walled hinge portion in said preform or container.

8. A container with hanger made according to the method defined in claim 7, wherein said hinge forming step is carried out while maintaining said preform as hot as in the injection molding step.

9. A container with hanger made according to the method defined in claim 7, wherein said hinge forming step is carried out in a same station as a step of regulating the injection molded preform to a temperature suitable for stretching.

10. A container with hanger, comprising a barrel portion having an annular bottom wall radially extending from a center point of said bottom wall and a hanger, wherein said hanger has a connection of substantially circular cross-section for connecting said hanger to the center point of said bottom wall of the barrel portion such that a portion of said annular bottom wall is separate from said flat hanger in a longitudinal direction.

11. The container of claim 10, wherein an external diameter of said connection ranges between 2 mm and 6 mm.

12. The container of claim 10, wherein a length of said connection ranges between 4 mm and 10 mm.

13. The container of claim 10, wherein the configuration of an opening formed in said hanger and a profile of said hanger are in line symmetry to an axis of said connection.

14. The container of claim 10, wherein said connection has a hinge portion formed therein by compressing said connection to form a thin-walled portion after an injection molding step, said hinge portion being flexible to permit said hanger to be folded.

* * * * *